US008438047B2

(12) United States Patent
Curtin et al.

(10) Patent No.: US 8,438,047 B2
(45) Date of Patent: May 7, 2013

(54) SYSTEM AND METHOD FOR FACILITATING CLAIMS PROCESSING (76) Inventors: Mary Jo Curtin, Minnetonka, MN (US); John P. Reinke, Edina, MN (US); Charles Bettes, Minnetonka, MN (US)

( * ) Notice: Subject to any disclaimer, the term of this patent is extended or adjusted under 35 U.S.C. 154(b) by 683 days.

(21) Appl. No.: 11/564,685

(22) Filed: Nov. 29, 2006

(65) Prior Publication Data
US 2008/0040164 A1 Feb. 14, 2008

Related U.S. Application Data (60) Provisional application No. 60/740,372, filed on Nov. 29, 2005.

(51) Int. Cl.
*G06Q 40/00* (2012.01)
(52) U.S. Cl.
USPC .................................................. 705/4
(58) Field of Classification Search ........... 705/4
See application file for complete search history.

(56) References Cited

U.S. PATENT DOCUMENTS

| | | | |
|---|---|---|---|
| 5,307,262 A | 4/1994 | Ertel | |
| 5,359,509 A | 10/1994 | Little | |
| 6,112,183 A | 8/2000 | Swanson et al. | |
| 6,341,265 B1 | 1/2002 | Provost et al. | |
| 6,343,271 B1 * | 1/2002 | Peterson et al. | 705/4 |
| 6,370,511 B1 | 4/2002 | Dang | |
| 6,581,067 B1 | 6/2003 | Bjergo et al. | |
| 6,879,959 B1 | 4/2005 | Chapman et al. | |
| 7,979,382 B2 * | 7/2011 | Guyan et al. | 1/1 |
| 2002/0046058 A1 | 4/2002 | Brown | |
| 2002/0165738 A1 | 11/2002 | Dang | |
| 2003/0069760 A1 * | 4/2003 | Gelber | 705/4 |
| 2003/0120588 A1 * | 6/2003 | Dodd et al. | 705/38 |
| 2003/0130875 A1 | 7/2003 | Hawash et al. | |
| 2003/0163778 A1 * | 8/2003 | Shores et al. | 715/500 |
| 2004/0049408 A1 | 3/2004 | Voss et al. | |
| 2004/0143456 A1 | 7/2004 | Ootsuka | |
| 2004/0204963 A1 | 10/2004 | Klueh et al. | |
| 2005/0234903 A1 | 10/2005 | Makino | |
| 2006/0149784 A1 * | 7/2006 | Tholl et al. | 707/104.1 |
| 2007/0282639 A1 | 12/2007 | Leszuk et al. | |

* cited by examiner

*Primary Examiner* — Daniel Felten
*Assistant Examiner* — Clifford Madamba
(74) *Attorney, Agent, or Firm* — Bridget M. Hayden; Dorsey & Whitney LLP (57) ABSTRACT

A system for providing a claims processing environment for facilitating claim adjudication includes a processor for generating an electronic interface configured to enable a user to edit claim data requiring one or more edits and for receiving the one or more edits, and a data storage component for storing the claim data and the received one or more edits, where the processor provides a scripting process based on the required one or more edits for facilitating user entry of the required one or more edits, said scripting process associated with the electronic interface. A method for facilitating claim adjudication includes identifying one or more claim edits required in a set of claim data for the claim data to adjudicate, providing a scripting process based on the required one or more claim edits, said scripting process facilitating entry of the required one or more claim edits, and receiving and validating the received claim edits.

16 Claims, 9 Drawing Sheets

Processing Tips

E02565 This message generates when the SPI indicator on the PPI screen contains a value that is displayed during claim processing with the appropriate 'translation' message.
Go to UNET and access SPI information in Preference related to your TIN.
Check the SPI comments to insure that claim is paying accurately.
NOTE: If the SPI indicates a fee schedule number, go to the index term and type Fee Schedule and the fee schedule number.
NOTE: If there is no SPI, access PPI to obtain the providers fee schedule number. Access Preference SPI volume at the index term and type Fee Schedule and the fee schedule number.

Is the claim paying correctly?

If YES, Go to Step 4.
If NO, Go to Step 3.

Enter override 02 into the OV field(s), appropriate remark code(s) into the RC field(s), and appropriate allowable into the MM or BaseAllow field(s) depending on which benefit is being utilized and continue to Step 4.
ALERT: When using an override, make sure the coinsurance percentage is correct before proceeding to the next step.
Enter override "09." Click CALCULATE and review returned financial information.
If all edits have been resolved and the 'OK TO PAY' edit is received, Click FINALIZE.

Additional Information: KL, Special Processing Instructions (SPIs)

SYSTEM AND METHOD FOR FACILITATING CLAIMS PROCESSING

CROSS-REFERENCE TO RELATED APPLICATION

The present invention claims priority to U.S. Provisional Patent Application No. 60/740,372, filed on Nov. 29, 2005, which is herein incorporated by reference in its entirety.

FIELD OF THE INVENTION

The present invention relates to facilitating insurance claim resolution by providing a method and system for guiding an individual such as a claims processor through the claim adjudication process.

BACKGROUND

As the number of individuals taking advantage of the opportunity to defray the costs of health care and other liabilities by purchasing insurance increases, the number of insurance claims grows each year, and an increasing number of adjustment requests are received for processing. Manual claims adjudication processes can become overloaded due to the increase in claims. In addition, manual adjudication processes via an electronic work queue may require a claims processor to navigate to multiple computer screens in order to research claims and retrieve the required data to finalize claims. Therefore, there is a need to provide claims processors with a way to efficiently adjudicate claims that require manual adjustment.

SUMMARY

A system and method provide for claim processing via a desktop or other graphical user interface (GUI) that guides a user such as a claim processor, through a claim adjudication process based on claim edits. The user may be guided via scripting processes that follow claim adjudication processes, where the scripting provided may be based on required claim edits, previously submitted claim edits, and/or based on the most common processing scenarios. This may enable claims to be resolved in the same manner regardless of a user's experience or claim interpretation, and scripting processes may reduce the number of keystrokes required to complete the claim adjudication process.

In one configuration, a system for providing a claims processing environment for facilitating claim adjudication includes a processor for generating an electronic interface configured to enable a user to edit claim data requiring one or more edits, and for receiving the one or more edits, and a data storage component for storing the claim data and the received one or more edits, where the processor provides a scripting process on the electronic interface based on the required one or more edits for facilitating user entry of the required one or more edits.

A method for facilitating claim adjudication includes identifying one or more claim edits required in a set of claim data for the claim data to adjudicate, providing a scripting process based on the required one or more claim edits, where the scripting process facilitates entry of the required one or more claim edits, and receiving and validating the received claim edits.

In further implementations, claims presented to a user for adjudication and resolution via the desktop may be routed to the user's work queue based on predefined routing logic, claim age and user skill level. Accordingly, claims appropriate to a particular user may be presented for resolution. This may improve user productivity because only the claims that are suitable for the user's skill level are routed to the user's work queue.

The implementations described above may increase user productivity, improve quality of service, and/or reduce the volume of errors caused by manual processing through automation and process standardization. In addition, standardization of claim edits may improve compliance with regulatory standards and contractual agreements with providers and members.

The methods and systems for processing claims using a desktop application may apply for various types of insurance claims including health-related service or product insurance claims, disability insurance claims, life insurance claims, liability insurance claims, or property insurance claims. Health-related insurance claim may include, for example, medical, dental, behavioral and/or vision claims for products and services, or other health-related products and services.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

DESCRIPTION OF THE DRAWINGS

FIG. 3B provides an illustration of an exemplary screenshot that includes scripting areas for facilitating claim editing.

DETAILED DESCRIPTION

A system and method that facilitate manual claims processing provide a desktop environment and an associated processing system that retrieves claim data associated with a claim, displays on a user interface claim data necessary to process the claim, and further provides a scripting process that guides a user (e.g., a claim processor) through the claim adjudication process. The scripting process may be considered similar to a "wizard" and is configured to facilitate processes required to make the claim in a condition for finalization, automated adjudication, or for other suitable systematic processing.

Figure 1:
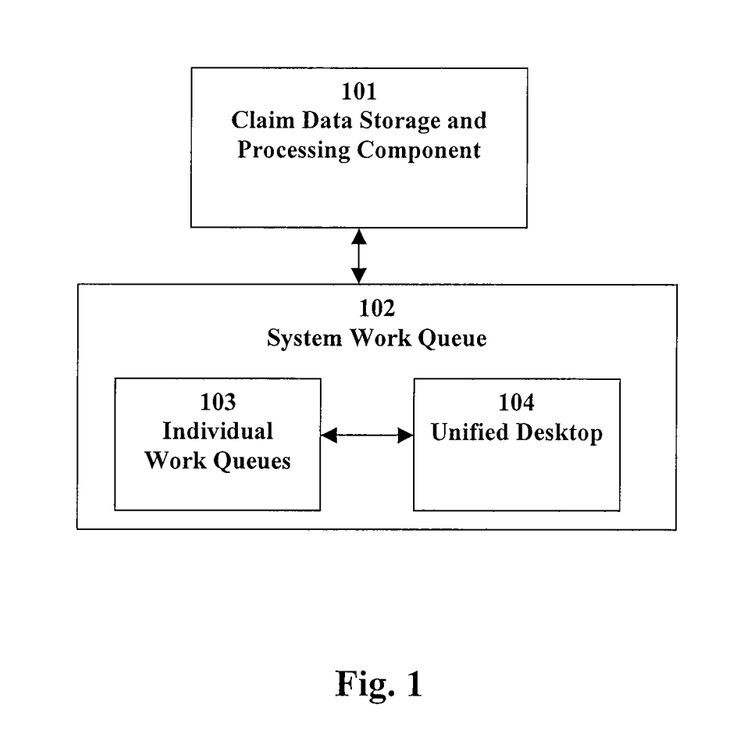
FIG. 1 depicts an exemplary system for providing a claims processing environment for a user.

FIG. 1 depicts a system for facilitating claim processing having claim data storage and processing component 101 and system work queue 102 having individual work queues 103 and associated desktop environments 104. The system may be provided in a web-based, online, intranet, other suitable environment, or combinations thereof that are useful in managing the claims payment process. The claim data storage and processing component 101 provided in FIG. 1 identifies claims that require manual adjudication, e.g., by identifying claims that have failed automatic adjudication and the reasons they failed to automatically adjudicate or by identifying claims that otherwise cannot be handled systematically and the reasons why they cannot be handled systematically; groups these claims for manual processing; and routes the appropriate claim data to system work queue 102. The claim data may be analyzed according to the type of adjudication required, prioritized according to difficulty in resolution of the claim and routed to a user's individual work queue 103 with a desktop 104 for manual processing. Each user desktop 104 provides scripting processes that facilitate manual claim adjudication and finalization of the claim data in the respective user's work queue 103.

Claim data storage and processing component 101 may be configured to identify and retrieve claim data from a variety of sources, including databases, data stores, and/or other data processors. In addition, claim data storage and processing component 101 may be configured to receive claim warnings and claim edits that are required to enable claim data to be adjudicated automatically. The warnings or edits received from the variety of sources may be used by claim data storage and processing component 101 to identify or filter the claim data necessary to facilitate editing and to present the data to the desktop environment 104 where the claim data may be edited by a user following scripting processes. In some implementations, the system also may retrieve only the information needed to process the claim correctly, may exclude information unnecessary for adjudication, and may identify a data set requiring the smallest number of edits for the claim adjudication type. Claim data storage and processing component 101 also may track and analyze the user's claim edits so that the claim data may be put into a condition where it may be released to be adjudicated automatically or otherwise systematically processed.

According to some implementations, the claim data storage and processing component 101 be configured to include a rules engine that operates concurrently with desktop 104 so that when a user submits claim edits, the claim data storage and processing component 101 applies rules to the edits to resolve the edits in real-time. If the claim data storage and processing component 101 successfully resolves the edits, the claim edit may be highlighted in desktop 104 to indicate to the user that the claim has been updated. In some cases, the rules engine operates intuitively so that, for example, upon resolution of one or more claim edits, other remaining claim edits may be automatically resolved based on the previous edits. After the required claim edits have been resolved, the claim data storage and processing component 101 automatically adjudicates the claim or routes the claim for automatic adjudication.

In some configurations, the system identifies reasons for claims failing automatic adjudication and determines the claim edits necessary to finalize the claim. In this way, the system focuses in on the information needed to process the claim correctly. In some configurations, the claim edits identified are provided to the user in an order that allows the claim to reach a point of eligibility for adjudication by entering the smallest number of edits compared to providing the edits in another order. The claim data storage and processing component 101 operating with desktop 104 may provide a user with a scripting process that provides instructions or tips on how to edit the claim so that, for example, claim payment processes can be finalized in a structured manner.

In further configurations, claims may be ranked according to the difficulty of the claim edits required, filtered based on a user's skill level, and routed accordingly to a qualified user's work queue. In another example, a user may have an associated profile that includes information about the type of claims suitable for adjudication by the user. For example, the user's profile may include a listing of policies assigned to the user, and when a user initiates their workflow, the system may automatically distribute claims associated with only those policies assigned to the user.

In additional configurations, claims may be distributed to users using a "first-in-first-out" (FIFO) logic based on claim receipt dates. For example, claims may be assigned priority points based on claim age, distributed to each user's work queue 103, and ordered in a user's work queue based on the highest priority points. In addition to priority points being based on the age of the claim, priority points may be assigned based on the dollar amounts charged. For example, for claims with billed charges between $25,000-249,999.99, an additional 6 points may be added to the priority point score, and for claims with billed charges greater than $250,000, an additional 50 points may be added to the base priority point score.

Figure 2:
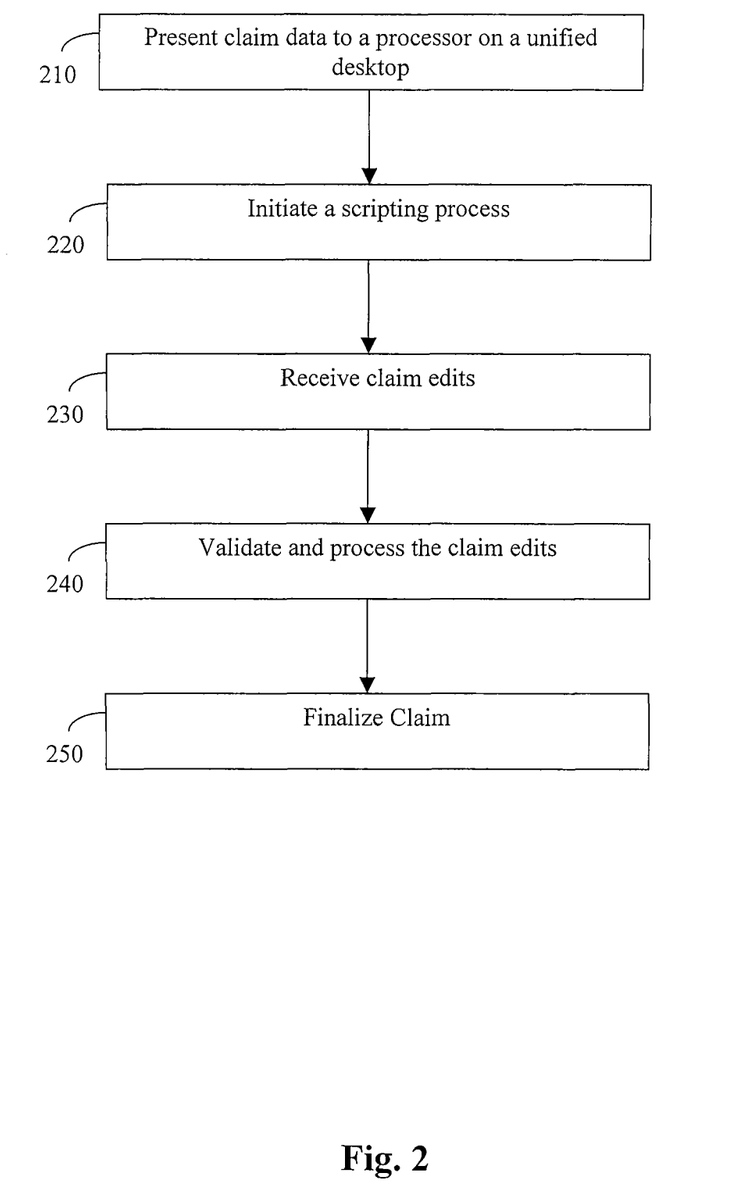
FIG. 2 provides a flowchart of a method for finalizing a claim via a desktop and its cooperation with the centralized claim data storage and processing area.

Claims may be processed in a desktop by a user navigating through a series of scripting processes, e.g., easy to read, context-sensitive HTML-based screens, that facilitate claim editing. FIG. 2 provides a flowchart of a method for finalizing a claim via a desktop and its cooperation with the centralized claim data storage and processing component. According to FIG. 2, claim data is presented (210) to a user on a desktop or other GUI. The claim data may be sent from a centralized claim data storage and processing component and presented in a desktop that is easy to navigate. A scripting process is initiated (220) on the desktop that, for example, highlights portions of the claim data requiring editing. In addition, processing tips and instructions that correspond to the edits required to process the highlighted portions of the claim data may be provided. In some implementations, processing tips may be viewed when a cursor or pointer is placed over claim data or other portion of the desktop. In one example, a code or list of codes may appear on the desktop when a cursor or pointer is placed over a portion of the desktop that requires code editing or entry. Claim edits are submitted by the user and captured by the desktop as the user is guided through the editing by the scripting process. The submitted claim edits are received (230) by the centralized claim data storage and processing component and are subsequently validated and processed (240). Once the required claim edits are resolved, i.e., by validating and processing (240), the user may receive an "Ok to Pay" edit from a scripting process that facilitates claim editing, and upon entry of the "Ok to Pay" edit, a finalization icon may be enabled for selection by the user. When claim finalization (250) is initiated, the claim may be written, with its modifications, to a file update queue, for example.

Thus, the desktop receives and sends data to the centralized claim data storage and processing component 101 and the two are configured to cooperate with each other in order to provide a user with a single desktop application that provides a user with guidance through claim adjudication, and in some instances, to claim finalization.

Figure 3A:
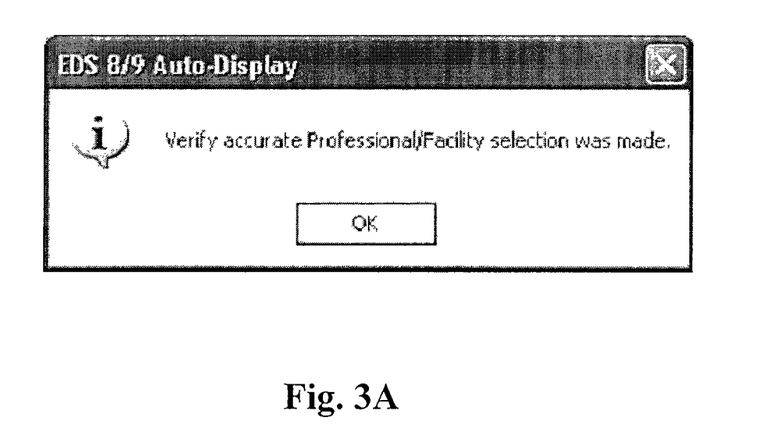
FIG. 3A provides an illustration of an exemplary pop-up box.

In some implementations, a user may be able to complete some edits using a scripting process, but not other edits. In this case, the user may be prompted to route the claim out of the user's work queue, or to correct the claim. When the user chooses to correct the claim, additional scripting processes may be invoked that facilitate further claim editing, for example by providing processing prompts until all edits are resolved or until the user selects one of the bypass processing options, e.g., route, suspend, transfer, or relocate. If additional edits or warnings are associated with the claim after further editing, the user may be prompted with a pop-up box alerting the user there are additional edits or with another scripting process. FIG. 3A provides an illustration of an exemplary pop-up box that may be displayed to a user while following a scripting process. This pop-up box is associated with a professional/facility scripting process, described below, and reminds the user of information required for the claim to adjudicate. In another example, a pop-up box may include functionality that allows users to bypass a current edit and move to additional edits, if needed.

FIG. 3B provides an illustration of an exemplary screenshot of a desktop that includes scripting areas for facilitating claim editing. According to FIG. 3B, a navigation header 305, displays "File", "Action" and "More Information" buttons, menu options, and icons to access external systems or applications for facilitating claim editing. Claim demographics 310 displays eligibility information such as an insured's policy number, the claim inventory control number, patient name, and other associated data. Professional/facility 315 identifies doctor/provider information. Special payee 320 provides information related to who or where claim payments should be sent. Edits 325 may provide a listing of claim edits performed or required that are listed by claim edit code and description. ICD-9 330 provides diagnosis codes and other related data or descriptions. The ICD-9 330 diagnosis/classification code in screen 300 is highlighted and requires editing or other processing, described below. Claim information 335 may provide claim amounts, for example.

FIG. 3B further includes a current claim information table 340 that may contain up to seven lines of detailed claim/procedure information. The current claim information table 340 may also provide icons that, when selected, perform actions on the current claim. The column headers for the current claim information table 340 may be abbreviated, though a description of each may be viewed by hovering the mouse over the column header. A "Fill" option may be available that allows the user to select a cell in the table and the associated column header to automatically fill the remaining rows in that column with the same information contained in the originally selected cell. In some implementations, data fields contained in the current claim information table 340 may be static, such as line number, patient responsibility amount, Medicare remark code and negotiated rate indicator. Current claim information table 340 in screen 300 includes highlighted place of service (POS) and service code (SvcCd) fields for line number 2, which corresponds to the data identified in the scripting process 344.

Scripting process 344 may be provided in a lower-mid section of screen 300. The scripting process is presented in order to guide the user through entry of claim edits. In some implementations, the scripting process may provide fields for the user to enter the correct the invalid data, or may provide the user with a list of possible items that may be selected to correct the invalid data. In FIG. 3, an invalid data scripting process 344 is provided at the forefront, and a history scripting process is provided in the background. According to scripting process 344, the two procedures listed in the claim information table 340 contain invalid data that include the SvcCd and the POS. A user may toggle between scripting processes on screen 300 by selecting the "Invalid Data" tab or the "History" tab.

Processing tips 345 may be displayed on the bottom of the screen 300. The processing tips are presented to facilitate claim editing, and the text of the processing tips 345 may vary depending on the claim edit required. In further configurations, a user may choose to hide the processing tips, but may select a processing tips icon if the user chooses to view the processing tips afterwards. The processing tips 345 of screen 300 informs the user that the highlighted POS and SvcCd in claim information table 340 and the Dx: field listing procedure code 8360 for tear of medial cartilage or meniscus in ICD-9 330 are invalid. Accordingly, the claim areas that are highlighted need editing or consideration by the user, and the scripting process 344 drives the edits. In addition, processing tips 345 provide a user with instructions and tips on how to resolve the required edits. In processing tips 345 in FIG. 3B, the edit code "E008-40 PS/SVC/C NOT COVERED" means that the range for the procedure code, i.e., 8360, is not built on the policy, and as a result, the service code, place of service in claim information table 340, and cause, i.e., procedure code in ICD-9 330, are highlighted. In addition, processing tips 345 provide the user with instructions on how to make the required claim edits.

The icons provided in FIG. 3B enable a user to perform specific claim edit functions. Additionally or alternatively, other icons may be presented for performing predefined functions or for launching scripting processes that facilitate claim editing. When a scripting process that facilitates claim editing is launched, the processing tips 345 displayed may change according to the scripting process launched.

The following is a description of icons that may be presented to a user on the desktop in order to perform various claim functions, some of which are provided in FIG. 3B. A "Restore Claim" icon may restore the claim to its original state when it was first displayed to the user. A "Claim Number Selection" icon may launch a scripting process for selecting a claim number. A "Professional/Facility Selection" icon 350 may launch scripting for editing the professional/facility portion of the claim. A "Dependent Selection" icon may launch scripting for selecting dependents. A "Special Payee Selection" icon 355 may display a pop-up asking the user to enter the tax identification number (TIN) of the special payee. When the user enters the TIN, a "Provider Selection" scripting process may be launched with search results pre-filled based on the TIN entered by the user. It should be understood that although icons are described above, a user may invoke scripting processes via other mechanisms. For example, a user may highlight or hover their mouse pointer over a field that requires editing, and in response, a scripting process may automatically launch.

In addition, the desktop may provide a user with access to variety of references that enables the user to research claims and claim requirements in order to adjudicate claims. The references may be read only references for providing the user with instruction or information related to claims or claim requirements, for example. In particular, an icon providing access to a knowledge library may be provided in the navigation header 305 of the desktop. The knowledge library may be a repository of policy and procedures, special processing instructions, and other processing information. Access to a state mandate website may also be provided via an icon in the navigation header 305, for example, and the website may provide legislative and state mandates relative to benefit and payment requirements.

Moreover, links provided in the navigation header 305 may provide seamless links to external web-based systems because by selecting a link, the desktop automatically provides the appropriate claim information to the web-based system search fields and thus enables a user to look up, for example, plan benefit information using the appropriate claim data.

Furthermore, and as depicted in FIG. 3B, a user may be provided with the ability to perform additional functions on the desktop. In FIG. 3B, for ICD-9 330, for example, a drop-down box 360 may be provided that allows a user to select a new code from a list of diagnosis codes. A scanned image of the claim may be viewed by selecting the "Pic" 365 icon. A "More" 370 icon is presented for reviewing more information related to the Dx: procedure code field, and in some implementations, a user may have the ability to change the primary diagnosis in the claim as part of the "More" functionality.

The above-described scripting processes and desktops providing scripting facilitate claim editing. This allows claims processing and finalization to be performed in the same manner regardless of the user. Below is a description of a variety of scripting processes that may be launched by the system and may guide a user through the claims adjudication process.

An eligibility scripting process presents a user with eligibility information for the insured individual as well as the patient. If the insured is the patient, only the insured individual's eligibility may be displayed. An eligibility scripting process may be useful for updating an incorrect member ID number or for updating a member's Medicare information if they are 65 years old or older.

A dependent data validation scripting process allows a user to select a dependent and release the claim for auto adjudication. In the dependent data validation scripting process, a list of available dependents may be displayed in a search results frame. In addition, the user may be presented with high-level keyed claim information as well as patient and insured eligibility information. The patient information represents what was keyed on the claim, while the insured information represents information on file from a central eligibility system. In some instances, as a part of the scripting process, a comments field containing keyed-comments may be displayed. Based on the information displayed, the user may determine which dependent line is correct, select/highlight the appropriate line, and release the claim for auto adjudication. In instances where no match is found, the claim may be released back into the claim data storage and processing system or it may be routed for further manual processing.

A dependent selection scripting process presents a user with a message in the processing tips and/or a highlighted edit indicating that missing dependent data prevented auto-adjudication of the claim. This wizard may allow the user to select a dependent and resolve the edit. According to this scripting process, a list of available dependents for the insured individual may be displayed, and upon selection of the appropriate dependent, the claim is refreshed with the new dependent information. Alternatively, if the user cannot find an appropriate dependent match, the user may enter a remark code on the current claim table and close the claim.

A professional/facility data validation scripting process allows a user to select a provider and release the claim for an attempt at auto adjudication. For example, the user may enter professional/facility search criteria, and the scripting process may retrieve a list of professional/facility information. The search function may give a user the ability to search by various search criteria such as by provider group, provider suffix, and/or TIN/SSN. In one example, a user searches for providers with a TIN corresponding to the TIN keyed on the claim. Retrieved professional/facility information presented to the user and may include high-level claim information as well as facility, group, or physician information that was keyed in the claim. In some implementations, a one or more pop-up boxes may be displayed to the user to remind them of data that is required to complete the scripting process. The pop-up box of FIG. 3A is an exemplary pop-up box that may be displayed to a user as they progress through the professional/facility data validation scripting process. In addition, as part of the scripting process, a comments field containing keyed comments may be displayed. After a user selects the appropriate professional/facility from the search results, the claim may be submitted for auto adjudication. In instances where the claim does not auto adjudicate, the claim may be routed for further manual processing.

A professional/facility selection scripting process allows a user to edit a claim when a lack of provider data prevented the claim from auto adjudicating. This scripting process may allow the user to search for and select a provider and resolve the edit. If a user is unable to select a provider, a pseudo TIN may be selected or a listing of pseudo TINs may be provided and selected from so that the user can continue the editing process. In other implementations, when a provider cannot be determined, the claim may be closed.

An edits/warnings scripting process for identifying possible duplicates allows users to accurately identify whether a current claim is a duplicate by browsing a list of previously processed claims. The edits/warnings scripting process may identify copay errors that allow the user to adjust the copay amount on the claim when the claim data storage and processing system is unable to do so. For duplicate edits, lines that are potential duplicates may be flagged, and a list of the claims that caused the duplicate or copay edits to generate may be displayed in a field on the desktop.

Figure 3C:
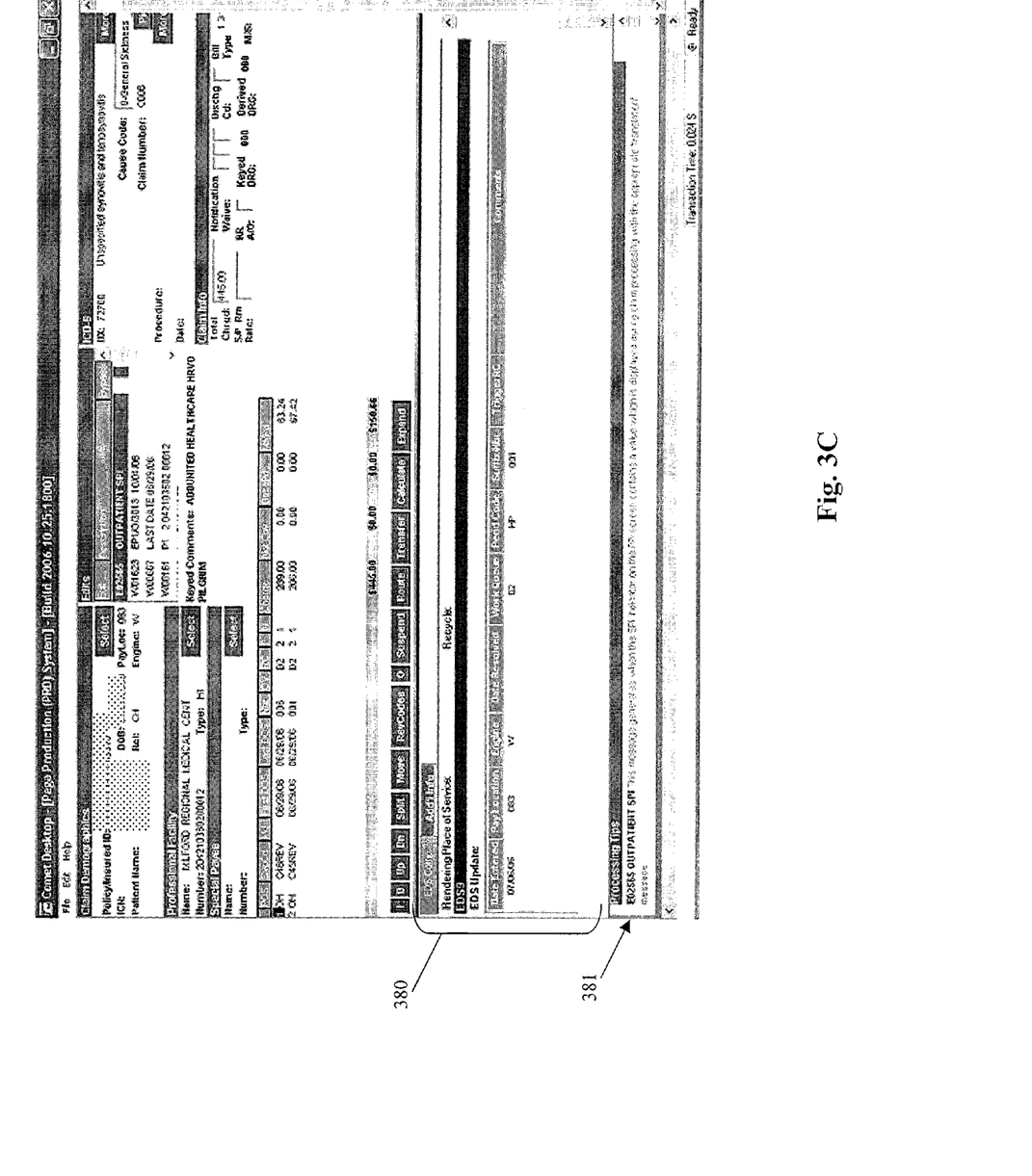
FIG. 3C is an illustration of an exemplary screenshot that includes a scripting process
Figure 3D:
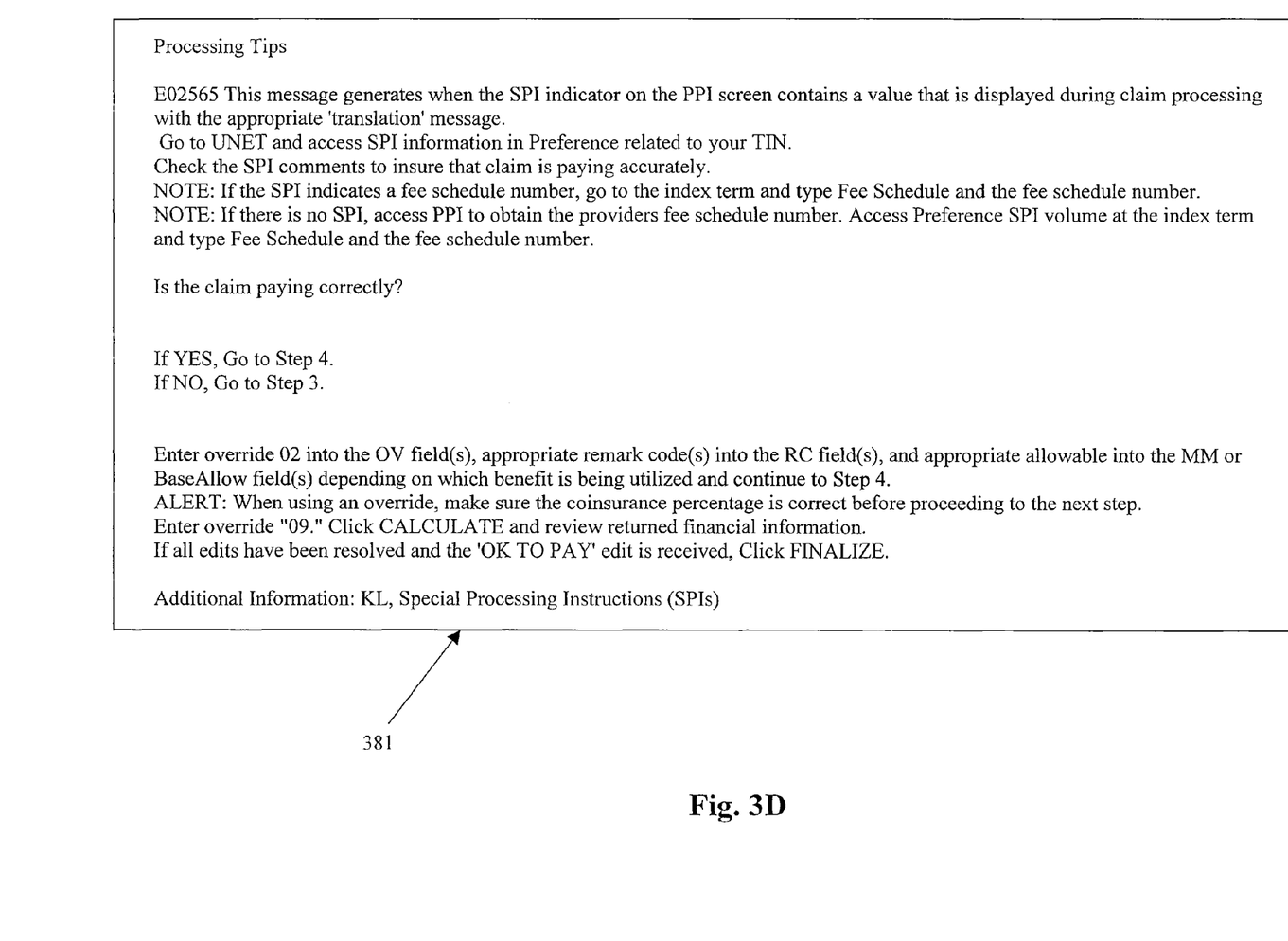
FIG. 3D is an illustration of a processing tip.
Figure 3E:
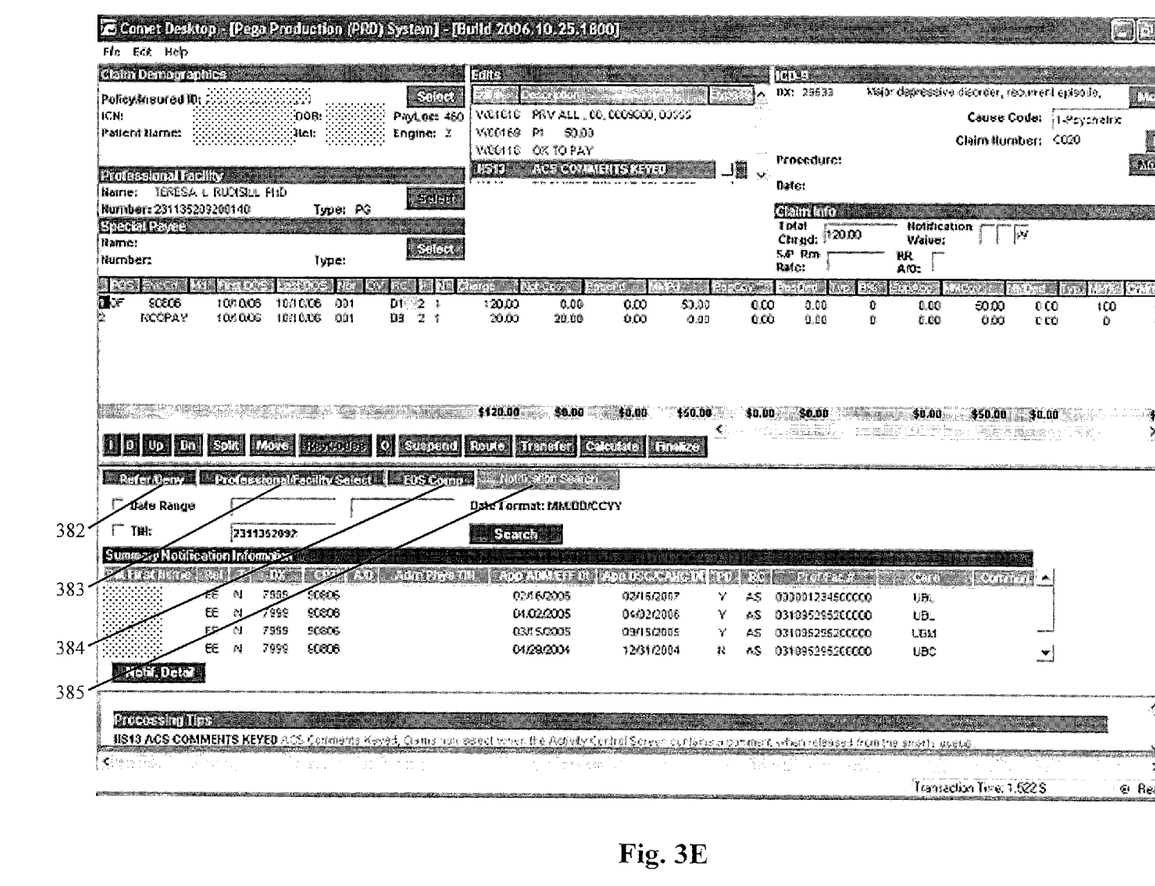
FIG. 3E provides another illustration of an exemplary screenshot that includes scripting areas for facilitating claim editing.

An electronic data system (EDS) scripting process allows a user to access applications external to the system and desktop. This scripting process may be provided to a user when data external to the claims processing system is required in order for the claim to properly adjudicate. For example, a user may select an icon from the navigation header 305 of FIG. 3B to access external systems or applications and be directed to an EDS scripting process. FIG. 3C depicts EDS scripting process 380 that indicates data related to the "Rendering Place of Service" needs updating using data from an external system. In addition, processing tips 381 are provided that give the user special processing instructions (SPI) that instruct the user how to access the correct information. FIG. 3D illustrates the entire processing tip 381 for the E02565 outpatient SPI.

A notification scripting process enables a user to match a current claim to a notification on file. The claim line needing the notification may be highlighted on a current claim table, and a match/calculate icon may be selected. This may associate the claim line with the notification on file, for example. In addition, the user may select a notification detail button that may present more detailed notification information. Comments also may be displayed for each line highlighted. The notification scripting process may be useful for matching notifications to procedures or treatments requiring notification and for properly handling claims requiring notification.

An invalid data scripting process enables a user to correct mis-keyed or missing information on a claim. In one example, a user may be presented with a list of provider type information based on the provider tax ID number on the current claim so that incorrect or missing provider information may be entered appropriately. In another example, the scripting process may display the first 25 lines of the original keyed information from a saved file for use as a reference in correcting the claim data. Where the keyed data is more than 25 lines, the user may be presented with a message directing them to view the claim image, e.g., by selecting the "Pic" icon described in relation to FIG. 3B.

An investigation data scripting process allows a user to determine if a patient is covered under other insurance and to make the necessary changes to the eligibility information and claim at hand. The investigation data scripting process may launch due to detected conflicts between a patient's eligibility information on file and the information on the claim. Alternatively, the investigation data scripting process may be initiated if a predetermined period of time has passed since a patient's certificate of benefits (COB)/Medicare information was investigated. In addition, the scripting process may enable a patient's eligibility information to be updated, so that, for example, a patient's COB, Medicare, or student indicator may be updated. The claim data may be refreshed with the updated information and submitted for automatic adjudication.

The claim number selection scripting process displays claim grouping numbers and details that may be a match for the current claim. The grouping information may be compiled from multiple claims in a claim history. In addition, the information may be filtered by diagnosis code or dates of service, and sorted according to date, for example. When the user identifies a claim grouping that the current claim should be assigned, the appropriate claim grouping may be highlighted and the select/calculate button may be selected in order to add the current claim to the selected claim grouping and to calculate the claim. If the user is unable to identify an existing claim grouping, then the next available grouping line may be selected and a new claim grouping number may be created.

The claim distribution scripting process presents a user with the total claim billed, previous allowance, total claim allowance, and the remaining allowance to be distributed across the current claim lines.

The alternate insurance scripting process allows users to coordinate claim payments for claims involving other insurance. For example, the scripting process may display a Medicare information frame and an alternate insurance frame providing various pieces of data from the claim. In some implementations, the information may be displayed in a read-only format. Where claims are to be combined, the scripting process may require that the combined total charged equal the sum of the original charged amounts.

A miscellaneous scripting process facilitates identification and correction of edits/warnings that identify possible timely filing allowances and determines whether a current claim meets the timely filing appeal criteria. In one implementation, where a user determines that the claim is allowed under the timely filing guidelines, an "Allow Claim" icon may be selected, and the reconsideration code from the claim may be applied to the remark code for all lines on the claim. If the user determines that the entire claim is not allowed under the timely filing guidelines, a "Deny Claim" icon may be selected, and the charge amount may be moved to a field indicating that the charge is not covered, and the user may assign an appropriate remark code to the claim. The claim may be calculated and subsequently display the financial information for the claim.

A resolve scripting process is a "catch all" and displays available common informational tabs. Because it is not known what information the user may need to handle the claim, this resolve scripting process provides the user with a variety of options for claim processing. For example, informational tabs available in the resolve scripting process may include a tab for comments, history, additional claim information, benefits, and contracting.

An employee not found scripting process is presented to a user when an employee listed on the claim cannot be found in an eligibility listing. This scripting process may allow the user to select the appropriate employee from a search results list by highlighting a row and affirming the selection. In addition, search results may be narrowed by inputting additional employee search criteria.

A multiple surgery scripting process may allow the user to review the patient's history and return claims with the same date of service. This scripting process may allow the user to manually enter an override code to resolve the edit(s).

It should be understood that a claim may require several edits and thus several scripting processes may need executing before claim payment can take place. Thus, for example, the screenshot of FIG. 3E may be displayed to a user when the "Refer/Deny" 382, "Professional/Facility Select" 383, "EDS Comp." 384, and "Notification Search" 385 scripting processes require execution before the claim may be adjudicated.

Figure 3F:
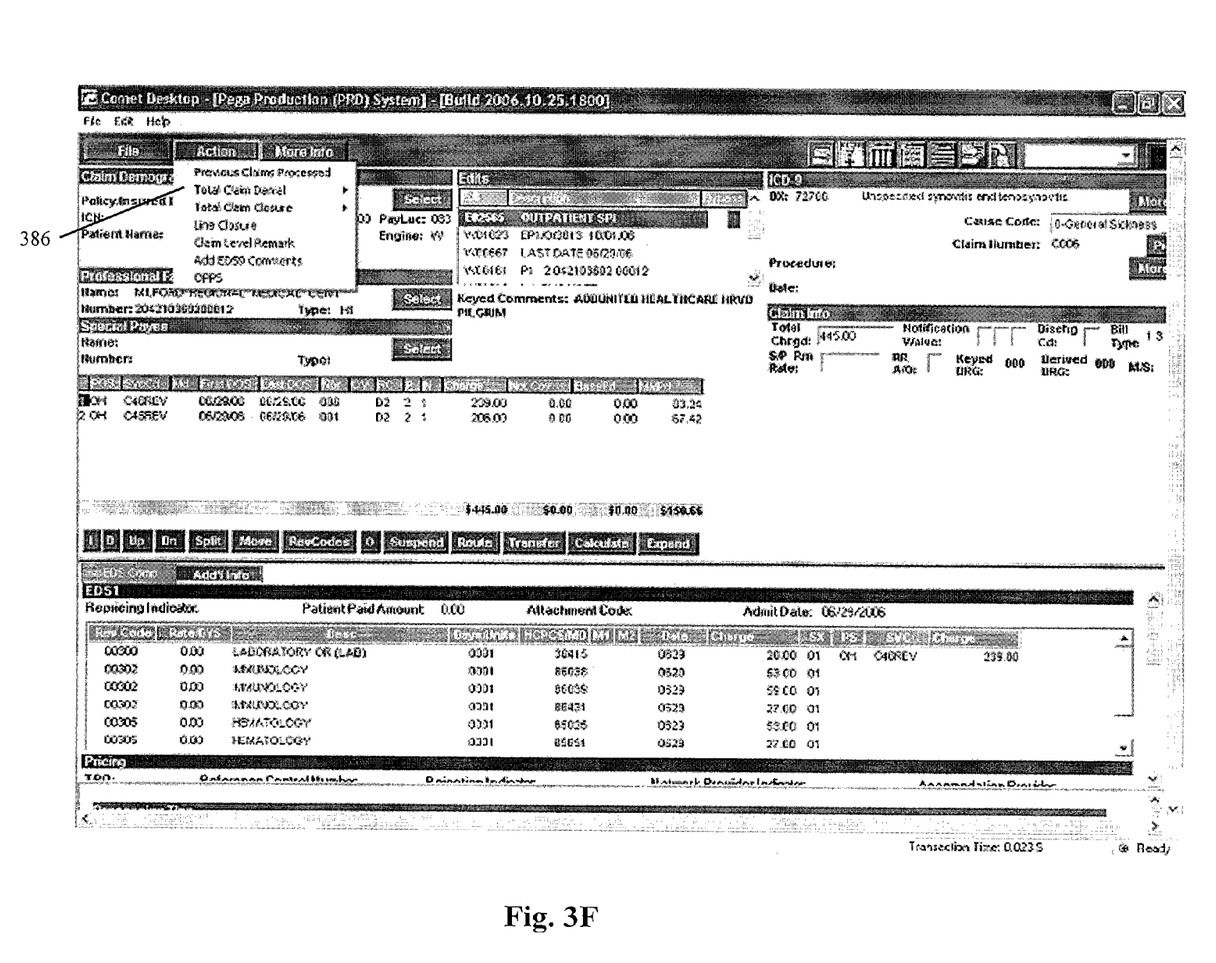
FIG. 3F depicts an exemplary screenshot in which an action pull-down menu is provided.

In some implementations, one or more actions may need to be completed in order to adjudicate the claim. FIG. 3F depicts an exemplary screenshot in which a user may select an action icon and an action pull-down menu 386 may be displayed to the user. The action pull-down menu may include items that when selected automatically perform one or more actions on the claim. For example, when a user selects "Previous Claims Processed", the system provides the user with a number of previously processed claims. This may be useful when the user needs information from a previously worked on claim. For "Total Claim Denial", the system may automatically perform the required actions, such as line completions, in order to deny the claim. The action items provided in the action pull-down menu 386 may reduce the number of keystrokes a user is required to perform, provides consistent automatic fill-in functions, and thus may improve the quality of the claims processing system. In addition, or alternatively, "hot keys" may be used to initiate certain claim actions, for example, for claim actions that are repeatedly used, so that when a "hot key" is selected, the system automatically fills-in data in the appropriate data fields. "Hot keys" also may enable a user to reduce their number of keystrokes, provide consistent automatic fill-in functions, and accordingly improve the quality of the claims processing system.

Figure 3G:
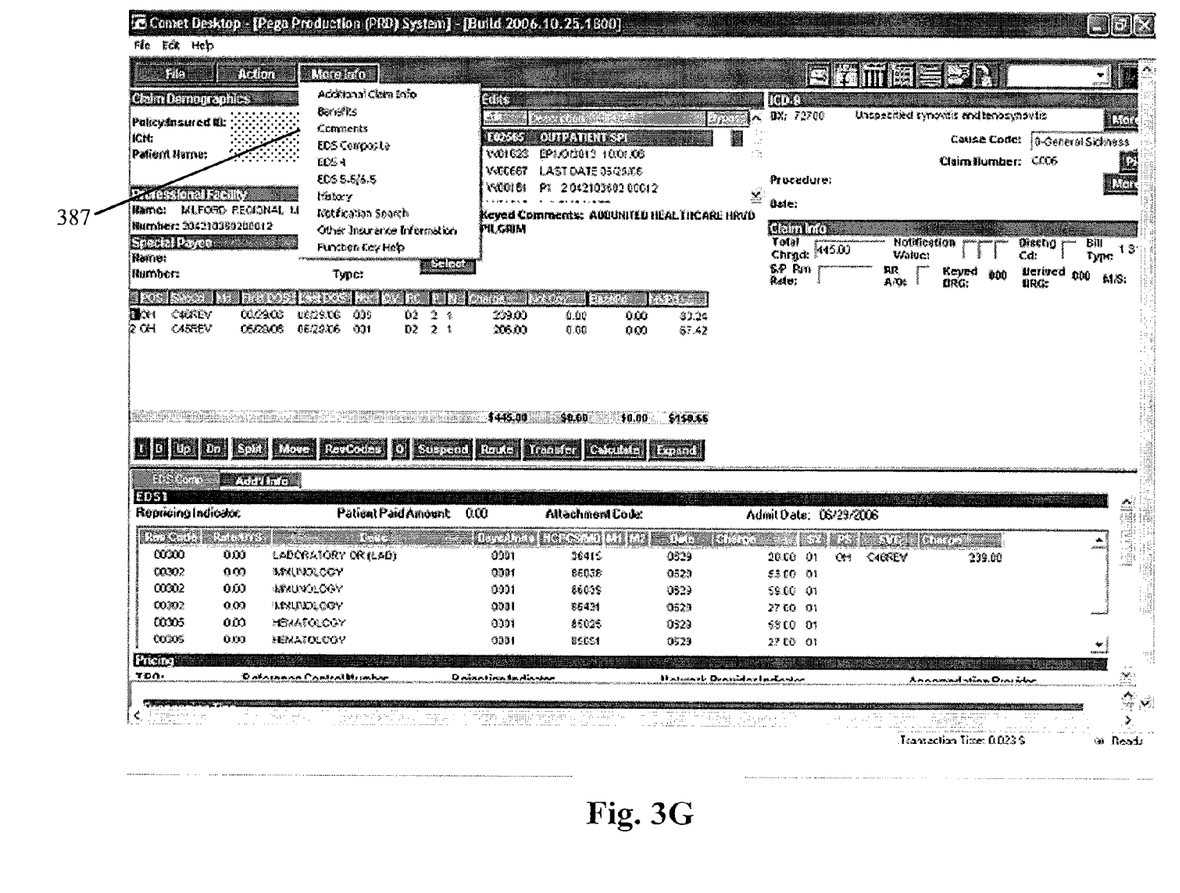
FIG. 3G depicts an exemplary screenshot in which a "More Info." pull-down menu is provided

In further implementations, one or more additional scripting processes may need to be executed that are not provided to the user. FIG. 3G depicts an exemplary screenshot in which a user may select a "More Info." icon and a "More info." pull-down menu 387 may be provided. The pull-down menu provides additional scripting processes that the user may select to execute in order to perform additional edits. For example, a user may select the "Comments" item in the pull-down menu and a user may be presented with a text box where the user can enter comments.

According to further implementations, the scripting processes described above may include options for splitting the claim or splitting a line within the claim. For example, a split line icon on the desktop may copy a highlighted or selected detail claim line and re-display it on the next available line. If a maximum number of claim lines are already listed, the split line button may prompt the user to split the claim before splitting the line.

When the user selects the "Split Claim" icon, an additional blank current claim table may be displayed, and the user may have the option to copy claim lines from the original claim to the new claim (and vice versa) as well as delete entire lines. The user may also have the ability to refresh the split claim, which may restore the claim to its original state. The user may have the ability to calculate and finalize the split claim and, in effect, generate a new claim suffix.

Certain configurations of the desktop provide tabs that display claim information to users that may be helpful in resolving the claim. The tabs available may vary according to the one or more scripting process active on a desktop. The following description identifies a variety of tabs that may be presented to a user on the desktop.

An additional claim information tab allows a user to view additional claim information that may be helpful in resolving the claim.

A claim history tab allows the user to view additional claim information such as a claim history summary and search for additional claim information.

A benefits tab allows the user to view additional claim benefits information.

An informational screen tab may provide a user with pricing data or other data contained on the claim data storage and processing unit.

A comments tab may provide a user with comments related to the claim that are normally viewable from system components external to the desktop.

An other insurance information tab may provide information such as claim COB, eligibility, policy age limits, auto-deny indicators, and Medicare, for example.

In some implementations, a user may have the option to view the tabs when working with any scripting process. Alternatively, a user may view the tabs described above when working with scripting processes that have the tab defined as a necessary data element.

When a user completes one or more scripting processes, the user may submit the claim back to the claim data storage and processing component by invoking certain transactions, and the claim may be processed according to the transaction invoked. The transactions may be invoked automatically, e.g., upon completion of the editing process, or upon selection of an icon. A number of possible transactions that a user may invoke are described below.

A calculate transaction may return modifiable claim elements to the claim data storage and processing component where the claim and its associated changes are processed. If issues are identified as a result of the processing, the claim may be returned to the user with any applicable edits or warning messages. If the calculate transaction returns an "Ok to Pay" message, the user may be presented with an additional fields related to financial information, and the user may have the ability to finalize the claim.

A route claim transaction may return the claim to the claim data storage and processing component where it may be routed for further processing or finalization.

A finalize transaction may be available to a user after the processor has calculated the claim and an "Ok to Pay" edit is displayed. Finalizing may pass all of the claim information back the claim data storage and processing component and the claim may be paid.

A suspend claim transaction allows the user to put a claim in suspended or hold status for a pre-defined period of time. In some implementations, the suspended claim may remain in the individual user's workbasket while on hold. After the suspension period has ended, the claim may be released back to the user for processing.

A return transaction allows users to route claims back to a previous user. This option is conditional and requires that a previous user worked on the claim.

A relocate claim transaction allows the claim to be routed to other systems and the claim may be removed from the user's work queue.

A close claim transaction may be available for some scripting processes and may close the claim in the user's work queue.

According to certain configurations, claims adjudication systems, such as those described in U.S. Pat. No. 5,359,509, having an issue date of Oct. 25, 1994, and entitled "Health Care Payment Adjudication and Review System", which is incorporated herein by reference in its entirety, may be implemented along with the disclosed inventive methods and systems.

In addition, claims processing systems, such as those described in U.S. patent application Ser. No. 11/562,131, having an application date of Nov. 21, 2006, and entitled "Method and System for Enabling Automatic Insurance Claim Processing", which is incorporated herein by reference in its entirety, may be implemented along with the disclosed inventive methods and systems.

The claim data storage and processing component described in various implementations, along with the additional aspects of the inventive method and systems, may be combined with a host system configured to communicate with various databases and software, and may operate in the manner disclosed in U.S. Pat. No. 6,112,183, having an issue date of Aug. 29, 2000, and entitled "Method and Apparatus for Processing Health Care Transactions through a Common Interface in a Distributed Computing Environment", which is incorporated herein by reference in its entirety. For example, the claim data storage and processing component may receive data related to insurance claim transactions from a variety of data formats, compression types, encryptions, native languages, countries of origin, or operating environments of origin, process the data to generate an interface definition language, and provide the processed data to a desktop configured as a common interface structure for processing the insurance claim transactions. This allows a user to view necessary information to address the claim edits via a desktop.

Furthermore, the disclosed inventive methods and systems be combined with additional customer service applications such as the one disclosed in U.S. Pat. No. 6,581,067, having an issue date of Jun. 17, 2003, and entitled "Method and System for Providing Administrative Support", which is herein incorporated by reference in its entirety.

It should be understood that the method and system according to the present invention may be implemented using various combinations of software and hardware as would be apparent to those of skill in the art and as desired by the user. The present invention may be implemented in conjunction with a general purpose or dedicated computer system having a processor and memory components.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A system for providing a claims processing environment for facilitating insurance claim adjudication, comprising:
    a database programmed to store insurance claim data comprising a plurality of insurance claims submitted for payment;

a processor programmed to:
- select and retrieve insurance claims submitted for payment that have not been paid from the plurality of insurance claims in the database, wherein the claims selected and retrieved have not been paid based on a failed automatic claim adjudication and require manual revision by a user for payment of the claims to proceed;
- identify one or more reasons the claims failed automatic claim adjudication and require manual revision; and
- generate scripting data based on the identified one or more reasons, wherein the scripting data comprises instructions to facilitate and guide the user in the manual revision of the claims for payment of the claims to proceed;

at least one computer user terminal configured to receive the claims requiring manual revision and the scripting data from the processor, display the claims requiring manual revision and the generated scripting data instructions, and accept manual edits to the claims from the user that are based on the scripting data instructions;

a rules engine that receives the accepted manually edits entered by the user through the computer user terminal and applies one or more claim adjudication rules to automatically resolve the manual edits; and upon automatically resolving the manual edits, the processor is programmed to:
- generate scripting data instructing the user to enter an accept payment claim edit; and
- receive the accept payment edit from the user, thereby enabling payment of the claims to proceed.

2. The method of claim 1, wherein the processor is further programmed to filter the selected and retrieved claims based upon an associated profile of the user that includes information about the type of claims suitable for adjudication by the user.

3. A method for facilitating claim adjudication, comprising:
- providing a computing system, the computing system having stored thereon machine executable code to perform the processes of:
  - selecting and retrieving from a plurality of insurance claims submitted for payment stored in a computer memory, one or more claims which have not been paid based on a failed automatic claim adjudication and that require manual claim edits to be entered by a user for the claim data to adjudicate and for payment of the claims to proceed;
  - generating a scripting process based on reasons the plurality of claims that require manual claim edits failed automatic adjudication, wherein the scripting process comprises instructions to facilitate the user in manually entering the claim edits required for the claim data to adjudicate and for payment of the claims to proceed;
  - providing the scripting process instructions to the user;
  - receiving manually entered claim edits based on the scripting process instructions;
  - validating the received claim edits using a rules engine that applies claim adjudication rules to the received claim edits and automatically resolves the claim edits; and
  - in response to resolving the claim edits, generating and providing to the user a scripting process instructing the user to enter an accept payment claim edit; and
  - receiving the accept payment edit from the user, thereby enabling payment of the claims to proceed.

4. The method of claim 3, wherein generating the scripting process further comprises:
- retrieving the set of claim data having one or more required claim edits from one or more sources;
- compiling the set of claim data having one or more required claim edits; and
- providing the set of claim data having one or more required claim edits and said scripting process to the user in an electronic format.

5. The method of claim 4, wherein the one or more sources provides claim data warnings identifying one or more claim issues that are required to be resolved before the claim data can be adjudicated, said claim data warnings provided to the user simultaneously with the scripting process instructions and for facilitating identification of the one or more claim edits required in the set of claim data for the claim data to adjudicate and for payment of the claims to proceed.

6. The method of claim 3, wherein providing the scripting process instructions further comprises providing claim editing tips.

7. The method of claim 3, wherein providing the scripting process instructions further comprises providing claim editing prompts.

8. The method of claim 3, further comprising filtering the set of claim data with the required one or more edits based on a user's skill level and the difficulty of the claim edits required.

9. The method of claim 3, further comprising analyzing the claim upon validating one or more of the received claim edits in order to determine whether additional claim information is required for the claim to adjudicate;
- generating another scripting process based on the additional claim information required for the claim to adjudicate, wherein the scripting process comprises instructions to facilitate the user in manually entering the claim edits; and
- providing the another scripting process instructions to the user.

10. The method of claim 9, further comprising retrieving the claim information required for the claim to adjudicate.

11. The method of claim 3, further comprising finalizing the claim upon receiving the accept payment edit from the user.

12. The method of claim 3, further comprising routing the claim having the validated claim edits.

13. The method of claim 3, wherein the claim is a health-related claim.

14. The method of claim 3, wherein selecting and retrieving from a plurality of claims further comprises filtering claims based upon an associated profile of the user that includes information about the type of claims suitable for adjudication by the user.

15. A method for facilitating insurance claim processing, comprising:
- providing a computing system, the computing system having stored thereon machine executable code to perform the processes of:
  - selecting and retrieving claim data to be adjudicated, the claim data representing an insurance claim submitted for payment, wherein the claim data is selected because the claim has not been paid based on a previously failed automatic adjudication;
  - identifying a subset of the claim data that requires manual revision by a user prior to adjudication and for payment of the claim to proceed;

identifying one or more reasons the subset of claim data failed automatic claim adjudication and requires manual revision prior to adjudication;

routing the subset of claim data requiring manual revision to one or more user terminals;

displaying the routed subset of claim data and scripting data at the user terminal, to the user, the scripting data comprising instructions for the manual revision of the claim, wherein the instructions are based on the identified one or more reasons the subset of claim data failed automatic claim adjudication and requires the manual revision for payment of the claim to proceed, wherein the displayed scripting data instructions guide the user through manually entering edits of the subset of claim data;

accepting as input manually entered claim edits from the user, the manual claim edits entered based on the scripting data instructions;

using a rules engine that applies claim adjudication rules to the manual claim edits and automatically resolves the claim edits; and in response to resolving the manual claim edits, generating and providing to the user a scripting process instructing the user to enter an accept payment edit; and receiving the accept payment edit, thereby enabling payment of the claims to proceed.

16. The method of claim 15, wherein the claim data is a health-related claim data.

* * * * *

UNITED STATES PATENT AND TRADEMARK OFFICE
CERTIFICATE OF CORRECTION

| | |
|---|---|
| PATENT NO. | : 8,438,047 B2 |
| APPLICATION NO. | : 11/564685 |
| DATED | : May 7, 2013 |
| INVENTOR(S) | : Mary Jo Curtin et al. |

Page 1 of 1

It is certified that error appears in the above-identified patent and that said Letters Patent is hereby corrected as shown below:

CLAIMS

| Column | Line | PTO | Should Read |
|---|---|---|---|
| 13 | 22 | "the accepted manually edits" | -- the accepted manual edits -- |

Signed and Sealed this
Thirtieth Day of July, 2013

Teresa Stanek Rea
*Acting Director of the United States Patent and Trademark Office*